United States Patent
Lavoie et al.

(10) Patent No.: US 12,033,503 B2
(45) Date of Patent: Jul. 9, 2024

(54) SYSTEMS AND METHODS FOR OPTICAL TETHERING IMAGE FRAME PLAUSIBILITY

(71) Applicant: Ford Global Technologies, LLC, Dearborn, MI (US)

(72) Inventors: Erick Lavoie, Van Buren Charter Township, MI (US); Hermanth Yadav Aradhyula, Farmington Hills, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 17/547,437

(22) Filed: Dec. 10, 2021

(65) Prior Publication Data

US 2023/0186761 A1     Jun. 15, 2023

(51) Int. Cl.
| | |
|---|---|
| *G08G 1/017* | (2006.01) |
| *B60T 8/172* | (2006.01) |
| *B60W 30/14* | (2006.01) |
| *G08G 1/054* | (2006.01) |
| *H04W 4/48* | (2018.01) |

(52) U.S. Cl.
CPC ............ *G08G 1/017* (2013.01); *B60T 8/172* (2013.01); *B60W 30/143* (2013.01); *G08G 1/054* (2013.01); *H04W 4/48* (2018.02)

(58) Field of Classification Search
None
See application file for complete search history.

(56) References Cited

U.S. PATENT DOCUMENTS

| | | | |
|---|---|---|---|
| 5,381,155 | A | 1/1995 | Gerber |
| 9,819,790 | B2 | 11/2017 | Choi et al. |
| 10,789,840 | B2 | 9/2020 | Boykin et al. |
| 2014/0058613 | A1 * | 2/2014 | Leinfelder ............ B60W 30/06 701/28 |

(Continued)

FOREIGN PATENT DOCUMENTS

KR     20200113996 A  * 10/2020

OTHER PUBLICATIONS

Toro Michael Ikon, Vehicle Speed Detecting App, MSc Software Engineering Final Project Report: Vehicle Speed Detecting App, 1-47.

*Primary Examiner* — Lail A Kleinman
*Assistant Examiner* — Mario C Gonzalez
(74) *Attorney, Agent, or Firm* — Frank Lollo; Eversheds Sutherland (US) LLP (57) ABSTRACT

The disclosure is generally directed to systems and methods for receiving from a mobile device that is optically tethered to a vehicle for remote driver assistance, an estimate of a speed of the vehicle, an orientation of the vehicle and a trajectory of the vehicle, comparing the estimate of the speed, orientation and trajectory received from the vehicle with a measured speed determined by one or more vehicle sensors, and preventing vehicle motion if a threshold difference from the comparison is exceeded. Another method is directed to determining at a mobile device an estimate of a speed of a vehicle, an orientation of the vehicle, a trajectory of the vehicle and a time stamp, transmitting the data to the vehicle, and untethering from optical tethering if the data are outside of a threshold or if the data indicate that the mobile device is tethered to an unintended vehicle.

17 Claims, 5 Drawing Sheets

(56) References Cited

U.S. PATENT DOCUMENTS

| | | | |
|---|---|---|---|
| 2016/0232410 A1 | 8/2016 | Kelly et al. | |
| 2018/0229729 A1* | 8/2018 | McQuillen | B60L 15/20 |
| 2019/0103026 A1* | 4/2019 | Liu | G06V 10/25 |
| 2019/0220001 A1* | 7/2019 | Lavoie | G05D 1/005 |
| 2019/0310629 A1* | 10/2019 | Taveira | G05D 1/0011 |
| 2020/0129106 A1* | 4/2020 | Arbel | G06F 3/017 |
| 2020/0279110 A1* | 9/2020 | Omata | G06F 3/011 |
| 2022/0237878 A1* | 7/2022 | Tartz | G06T 19/20 |

\* cited by examiner

SYSTEMS AND METHODS FOR OPTICAL TETHERING IMAGE FRAME PLAUSIBILITY

BACKGROUND

Despite significant developmental efforts in vehicle automation, many vehicles still require a certain level of human participation to carry out operations that are not fully autonomous. For example, a parking operation performed by a vehicle that is partially autonomous may necessitate certain actions to be carried out by an individual who is standing on a curb or roadside and remotely controlling the movements of the vehicle via a mobile device.

Vehicles with a driver assistance feature transmit a confirmation signal when the vehicle to a phone using the wireless data connection such as BLE, when the vehicle is ready to move. The phone will then provide an interface to a user to coach him/her to aim the phone camera at the vehicle to begin vehicle motion for chosen vehicle driver assisted feature. Next, user will aim the phone camera at the vehicle and the phone will begin capturing image frames to match a 3D computer aided design (CAD) surface model of the vehicle to the vehicle in the image frame. If the phone successfully locks onto the vehicle, the maneuver can begin. A user may be asked to provide an additional vehicle motion command such as pressing a button.

It is desirable to provide solutions that address the ease of authentication for mobile devices to remotely control a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

This disclosure generally relates to vehicles, and more particularly relates to systems and methods to support optical tethering image frame plausibility.

In terms of a general overview, this disclosure is generally directed to systems and methods for optical tethering image frame plausibility. An example method includes receiving from a mobile device that is optically tethered to a vehicle for remote driver assistance, an estimate of a speed of the vehicle, an orientation of the vehicle and a trajectory of the vehicle, comparing the estimate of the speed, orientation and trajectory received from the vehicle with a measured speed determined by one or more vehicle sensors, and preventing vehicle motion if a threshold difference from the comparison is exceeded.

In one or more embodiments, the method further includes receiving from the mobile device one or more data time stamps, the comparison including verifying that the estimate of the speed is current, preventing vehicle motion if the one or more data time stamps are outside of a threshold identifying current data, and allowing vehicle motion if the threshold difference of the vehicle speed is within a predetermined threshold.

In one or more embodiments the preventing vehicle motion if the threshold difference from the comparison is exceeded includes generating a user engagement score, the user engagement score including a combined score based on at least the speed, orientation and trajectory provided by the mobile device, transmitting a warning to the mobile device if the user engagement score fails to meet a first predetermined minimum, and disabling the optical tethering and remote control of the vehicle if the user engagement score fails to meet a second predetermined minimum.

In one or more embodiments the method further includes receiving from the mobile device parameters related to a user of the mobile device including one or more of an orientation of the user to the vehicle, an orientation of the user to the mobile device, a speed of the user, a duration of an orientation of the vehicle with respect to a center of a camera-viewed vehicle image on the mobile device, and a number of deviations from a center orientation for the viewed vehicle in an augmented reality view on the mobile device including a surface model of the vehicle, combining the parameters to generate a user engagement score, and transmitting to the mobile device instructions for the user related to the parameters to prevent disengaging the optical tethering and remote control of the vehicle with the mobile device as a function of the user engagement score.

In one or more embodiments, the method may include transmitting to the mobile device instructions for the user related to the parameters to prevent disengaging the optical tethering and remote control of the vehicle with the mobile device as a function of the user engagement score.

Another embodiment is directed to a system for a vehicle including a memory that stores computer-executable instructions, a transceiver configured to receive from a mobile device that is optically tethered to remotely control the vehicle, an estimate of a speed of the vehicle, an orientation of the vehicle and a trajectory of the vehicle, a processor configured to access the memory and execute the computer-executable instructions to compare the estimate of the speed, orientation and trajectory with a measured speed determined by one or more vehicle sensors and prevent vehicle motion if a threshold difference from the comparison is exceeded.

Another embodiment is directed to a method for a mobile device optically tethered to remotely control a vehicle including determining at the mobile device an estimate of a speed of the vehicle, an orientation of the vehicle, a trajectory of the vehicle and a time stamp, transmitting the estimate of the speed of the vehicle, the orientation of the vehicle and the trajectory of the vehicle to the vehicle, and untethering from optical tethering to the vehicle if the one or more data time stamps are outside of a threshold identifying current time data or if the estimate of the speed of the vehicle, the orientation of the vehicle, and the trajectory of the vehicle indicate that the mobile device is tethered to an unintended vehicle.

In one or more embodiments, the method further includes determining parameters related to a user of the mobile device including one or more of an orientation of the user with respect to the vehicle, an orientation of the user with respect to the mobile device, a speed of the user, a duration of an orientation of the vehicle with respect to center of an image on the mobile device, and a number of deviations from the orientation of the image, combining the parameters to generate a user engagement score, and transmitting the user engagement score to the vehicle optically tethered to the mobile device.

In one or more embodiments, the method further includes displaying on the mobile device a plurality of concentric perimeter windows surrounding the image representative of a concentric magnitude of deviations from a center, calculating a magnitude of deviation from the image based on the plurality of concentric perimeter windows, and calculating deviations over a predetermined period of time.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment events. The level of human intervention is very low. Level 5 (L5) vehicles are fully autonomous vehicles that do not involve human participation.

Figure 1:
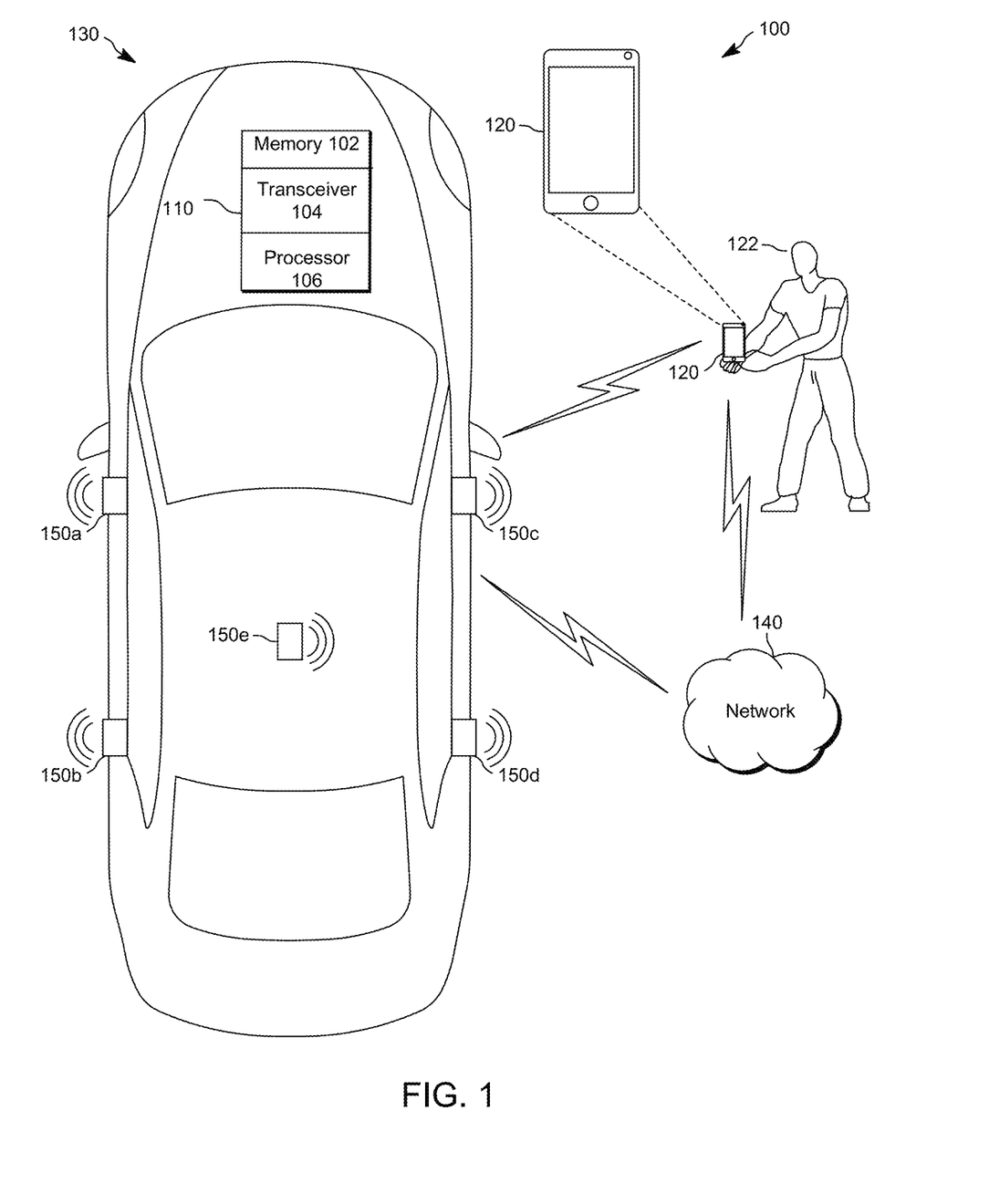
FIG. 1 illustrates an example system that includes a mobile device and vehicle configured to enable optical tethering in accordance with and embodiment of the disclosure.

FIG. 1 illustrates an example system 100 that includes a mobile device 120 configured to transmit remote control commands to a vehicle 130 in accordance with an embodiment of the disclosure. The vehicle 130 may be one of various types of vehicles such as a gasoline powered vehicle, an electric vehicle, a hybrid electric vehicle, or an autonomous vehicle, that is configured as a Level 2 or higher automated or semi-automated vehicle. The system 100 may be implemented in a variety of ways and can include various types of devices. For example, the example system 100 can include some components that are a part of the vehicle 130, some components that may be carried out by a user 122 of mobile device 120, and, in some embodiments, other components that are accessible via a communications network 140. The components that can be a part of the vehicle 130 can include a vehicle computer 110, and a wireless communication system in communication with the vehicle computer 110. Mobile device 120 may include a smartphone, a display key fob, a tablet computer, such as an iPad®, or can include a headset capable of augmented reality display or the like.

The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.). Vehicle computer 110 includes memory 102, transceiver 104 to enable communications, and processor 106.

The vehicle computer 110, in one or more embodiments, may be used to support features such as passive keyless operations, remotely-controlled vehicle maneuvering operations, and remote vehicle monitoring operations. Vehicle computer 110, in one or more embodiments, may execute certain operations associated with remotely-controlled vehicle maneuvering and/or remote vehicle monitoring in accordance with the present disclosure.

The wireless communication system may include a set of wireless communication nodes and/or sensors 150a, 150b, 150c, 150d and 150e mounted upon vehicle 130 in a manner that allows the vehicle computer 110 to communicate with devices such as the mobile device 120. Examples of wireless communication nodes 150a, 150b, 150c and 150e may include sensors and/or emitters capable of detecting objects, distances such as ultrasonic radar, LiDAR, cameras, and the like. In one or more embodiments, wireless communications nodes 150a, 150b, 150c, 150d and 150d may further include one or more of Bluetooth®-enabled sensors, or Bluetooth® low energy (BLE)-enabled sensors. Further, in one or more embodiments, wireless communication node data may be enhanced or substituted with cloud-based network data communicated to vehicle 130. In an alternative implementation, a single wireless communication node and/or sensor 150e may be mounted upon the roof of the vehicle 130. Other sensors may also be present in vehicle 130 including wheel speed sensors, accelerometers, rate sensors, GPS sensors, and steering wheel sensors. The wireless communication system may use one or more of various wireless technologies such as Bluetooth®, Ultra-Wideband (UWB), Wi-Fi, ZigBee®, Li-Fi (light-based communication), audible communication, ultrasonic communication, near-field-communications (NFC), Bluetooth® low energy (BLE) and the like, for carrying out wireless communications with devices such as the mobile device 120.

The vehicle computer 110, and the mobile device 120 may connect via the communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, Bluetooth Low Energy (BLE), cellular, near-field communication (NFC), Wi-Fi, Wi-Fi direct, Li-Fi, acoustic or ultrasonic audio communication, Ultra-Wideband (UWB), machine-to-machine communication, and/or man-to-machine communication.

In one or more embodiments, communications network 140 includes a cellular or Wi-Fi communication link enabling the mobile device 120 to communicate with network 140, which may include a cloud-based network or source for transferring data in accordance with this disclosure.

A software application may be provided in the mobile device 120, which allows a user to use the mobile device 120 for performing remote-control operations such as, for example, locking and unlocking of the doors of the vehicle 130, and for monitoring some actions performed autonomously by the vehicle 130. One example of an action performed autonomously or semi-autonomously by the vehicle 130 is a self-parking operation. The mobile device 120 may communicate with the vehicle computer 110 via one or more of the first set of wireless communication nodes 150a, 150b, 150c, 150d and 150e perform a self-parking operation. For example, mobile device 120 may transmit remote-control commands to control some maneuvers performed by the vehicle 130 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation).

In an example self-parking procedure, a user who may be driving the vehicle 130, gets out of the vehicle 130 and uses the mobile device 120, which may be an iPhone®, a handheld device, or a wearable, such as a headset or other hands-free device capable of being used, for example, to remotely initiate an autonomous parking procedure of the vehicle 130. During the autonomous parking procedure, the vehicle 130 moves autonomously to park itself at a parking spot located near the user. In another case, the vehicle 130 can be a L2 level vehicle that performs a parking maneuver without human assistance. The user may remain in contact with mobile device 120 and monitor the movement of the vehicle 130 during the parking maneuver to replicate the similar oversight the individual provides when manually driving. In one or more embodiments, the user interacts with vehicle 130 using augmented reality tracking. Prior to enabling augmented reality tracking of a vehicle, embodiments provide for enabling secure authentication of a mobile device to vehicle 130 for augmented reality tracking of vehicle 130.

Figure 2:
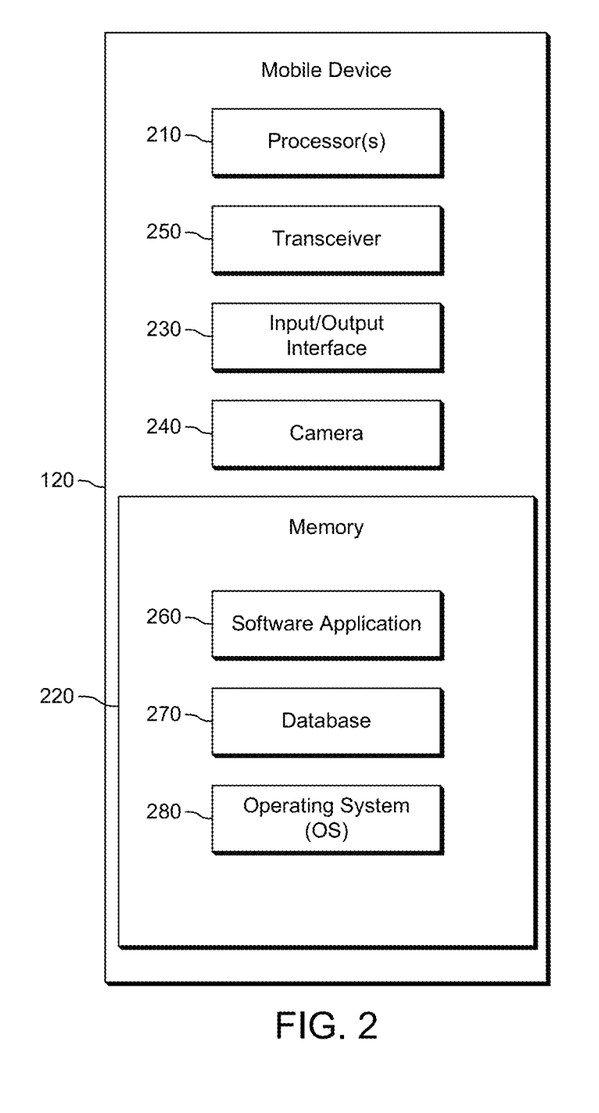
FIG. 2 illustrates some example functional blocks that may be included in a mobile device in accordance with an embodiment of the disclosure.

FIG. 2 illustrates some example functional blocks that may be included in the mobile device 120 in accordance with an embodiment of the disclosure. The functional blocks of the mobile device 120 may include a processor 210, memory 220, an input/output (I/O) interface 230, camera 240, which may be a stereo camera to enable an overlay display, transceiver 250, software application 260, database 270, and an operating system (OS) 280. The I/O interface 230, may include a touchscreen having softkeys (graphical icons), and a biometric component (to enable facial recognition, a fingerprint scanner, or a microphone for voice command input). Some of these components may perform functions that are integral to the mobile device 120, such as, for example, handling phone calls and running software applications downloaded from the Google Play store. The operating system 280 can be any of various kinds of software used for operating the mobile device 120 such as, for example, an iOS® operating system, an Android® operating system, or a Windows® operating system.

The software application 260 may be a software application that is downloaded into the mobile device 120 from an app store. In one or more embodiments, the software application 260 is an augmented reality software application that enables remote control of a vehicle. One example of a remote-control software application is FordPass™. The remote-control software application may be used to carry out various remote-control operations such as, for example, a vehicle self-parking operation, a trailer-hitch assist operation, and/or a trailer maneuvering assist operation.

In one or more embodiments, software application 260 operates to carry out various actions for optically tethering the mobile device 120 to a vehicle. For example, transceiver 250 can include a wireless transmitter and/or a wireless receiver that is used to communicate with a transceiver in the vehicle 130 to establish communications and monitor or establish optical tethering. The communications may be carried out by using any of various wireless formats such as, for example, such as those described above like Bluetooth®, Ultra-Wideband (UWB), Wi-Fi, ZigBee®, Li-Fi (light-based communication), audible communication, and ultrasonic communication. The transceiver 250 may be coupled to various components in the vehicle 130, such as, for example, a system for in-vehicle communications (displaying messages, providing warnings, etc.) and in some embodiments also be coupled to wireless communication nodes and sensors 150a, 150b, 150c, 150d and 150e.

The computer 110 in vehicle 130 may be configured to operate in cooperation with the software application 260 in mobile device 120 to execute various operations associated with optical tethering of the mobile device 120 to vehicle 130 by transmitting vehicle 130 information to ensure that the correct vehicle is optically tethered to the correct mobile device 120 and to untether or disable remote control of vehicle 130 when necessary in accordance with one or more embodiments.

The memory 220, which is one example of a non-transitory computer-readable medium, may be used to store the operating system (OS) 280, database 270, and various modules such as the software application 260. One or more modules in the form of computer-executable instructions may be executed by the processor 210 for performing various operations in accordance with the disclosure. More particularly, software application 260 may be executed by the processor 210 for optically tethering mobile device to vehicle 130 to enable augmented reality tracking for carrying out various operations upon the vehicle 130 (self-parking operation, trailer-hitch assist operation, trailer maneuvering assist operation, etc.). The software application 260, in one or more embodiments, may be executed for performing augmented reality procedures and visually illustrating vehicle 130 on the mobile device 120 in accordance with the disclosure.

Figure 3:
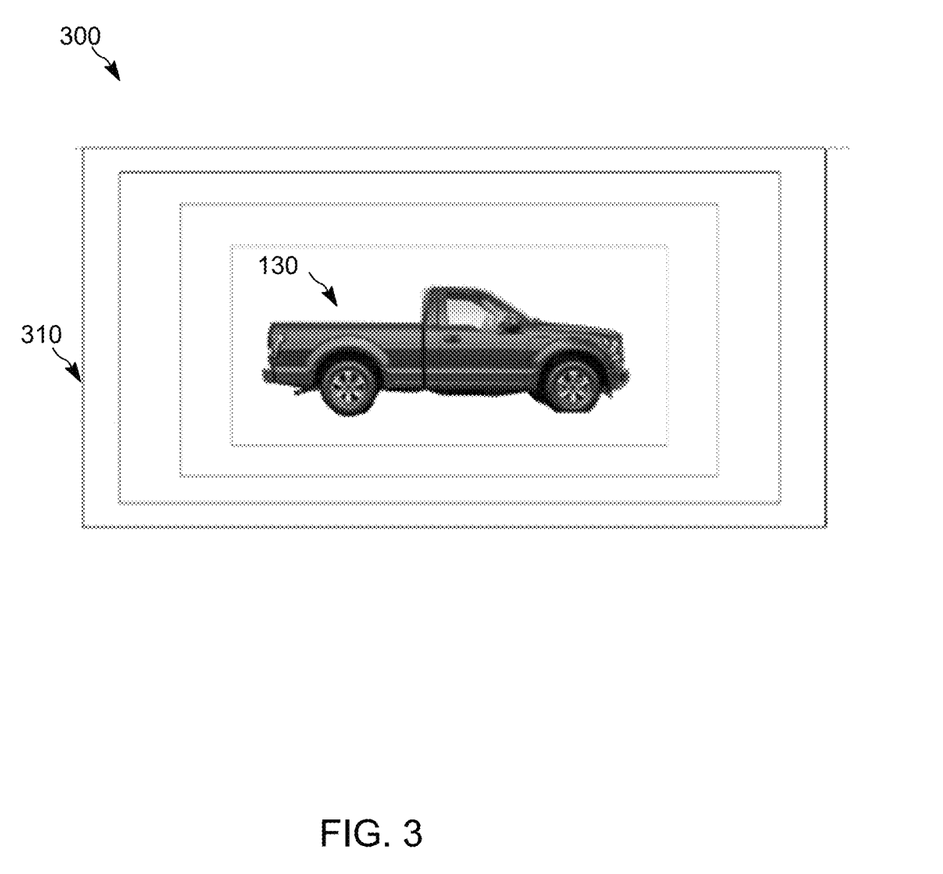
FIG. 3 illustrates a mobile device display screen of a remotely-controlled vehicle through optical tethering in accordance with an embodiment of the disclosure.

Referring now to FIG. 3, mobile device 120 includes display 300 as shown that illustrates user engagement with vehicle 130. In accordance with an embodiment, a user makes sure that vehicle 130 is centered in the display 300 while the vehicle 130 performs a maneuver. Further illustrated is deviation windows 310 around image 320 with certain magnitudes 330 associated to each deviation window. For a given time period, according to embodiments, measures are taken of parameters including duration of vehicle 130 at the center of display 300, number of deviations in a given time frame, and the cumulative magnitude of the deviations.

In accordance with embodiments, at the start of a time period, a user may direct a front camera on mobile device 120 to perform gaze detection to make sure that the user is looking toward vehicle 130 and toward the display 300 for an appropriate amount of time while vehicle 130 is in motion. For example, in some embodiments, a user may glance down at mobile device 120 for a brief period but continue looking toward vehicle 130 most of the time. Additionally, or alternately, vehicle 130 may have cameras focused on a user to assess which way a user is looking.

In one or more embodiments, by combining calculated parameters, a user engagement score may be generated. In one or more embodiments, if a user engagement score is less than a threshold, a determination is made that a user is not engaged sufficiently while and remote activity can be disabled and/or a warning provided to the user to pay closer attention. For example, a warning may be communicated using audible, visual, and/or haptic feedback. In other embodiments, deviation windows 310 may assist in coaching the user to keep an image of vehicle 130 at the center of the display image 300 or alert them when they are about to lose the image of vehicle 130 from the display 300.

In one or more embodiments, deviation windows 310 further include accounting for a user's proximity to vehicle 130 to determine if the shape of vehicle 130 exceeds the size of deviation windows 310 as a result of being too close. When closer, in one embodiment, deviation windows 310 are scaled to account for whether a user is engaged and if vehicle 130 is centered. More specifically, taking into account, for distance versus size on screen, if a user 122 is closer to vehicle 130, vehicle 130 will appear larger on the screen display 300, and the edges of vehicle 130 will be detected as exceeding the deviation windows 310. With information regarding the distance to vehicle 130, in one or more embodiments, the size of image screen 100 dynamically changes, or dynamically adjusts a level gain to a score represented by each of the deviation windows 310.

In one or more embodiments, a balance using two deviation scores, one for the left and the right, and a difference value can be calculated to determine if vehicle 130 is still centrally located on screen 310. For example, deviation scores can be subtracted one from the other, and the results compared to a value of 0+/−a margin of errors. If a user is closer to vehicle 130, various levels of deviation windows may be exceeded, but if they both exceed by a similar amount within a margin of error then the user's engagement is maintained based on the score results.

In another embodiment, a user's engagement may be measured according to the user's ability to track vehicle 130 motion using inertial sensors on mobile device 120.

For example, in one or more embodiments, an interface may query a user or ask a user to always keep vehicle 130 at the center of display 300. When vehicle 130 moves away from the center of display 300, its trajectory may be calculated by using image processing and a response in the similar direction from the user is expected to make sure vehicle 130 is centered on the screen 300. An actual tracking trajectory of the user in the real word may be determined in accordance with an embodiment, by using inertial sensors of mobile device 120 and verified by using image processing on a video feed, for example. Parameters such as how fast a user 122 is able to catch up with a vehicle 130 trajectory, placement of vehicle 130 at the center of display screen 300, how often vehicle 130 moves out of focus, and the like may be calculated and sent to vehicle computer on vehicle 130 to determine a level of user engagement with remote features for controlling vehicle 130.

In another embodiment, user engagement with vehicle 130 may be calculated by measuring vehicle 130 motion in the center of mobile device 120 display screen 300 the phone's as compared to vehicle 130 motion as detected by sensors on vehicle 130.

For example, if mobile device 120 phone detects parameters like orientation of the vehicle, orientation of the phone, speed of the user, duration of the car at the center of image, number of deviations in a given time frame, and the cumulative magnitude of the deviations and sends these to vehicle. The vehicle uses these to determine the user's engagement with any remote control features. Vehicle 130 may also send information to mobile device 120 to improve the augmented reality tracking, such as a planned path during a maneuver or the like.

Although user engagement may be confirmed using parameters and calculating deviations, a user may still erroneously engage with a wrong vehicle. Accordingly, one or more embodiments are directed to ensuring that the user is engaged with the correct vehicle and disengaging optical tethering if the system detects that the user is optically tethered to a different vehicle.

In one or more embodiments, optical tethering safety is accomplished by estimating vehicle speed, and wireless transmitting the speed to vehicle 130 so that vehicle computer can compare the speed to a speed measured by vehicle

130 sensors 150. Another safety method includes detecting whether or not a mobile device camera is "stuck" on a same frame.

In one or more embodiments, when a remote control feature such as a remote driver assist technology ("ReDAT") feature is ready to begin vehicle motion, vehicle 130 transmits a confirmation signal to mobile device 120 using wireless data connections such as BLE. Mobile device 120 provides user 122 with an interface to coach the user to aim mobile device 120 at vehicle 130 to begin vehicle motion for the desired remote control feature. Next, user 122 aims mobile device 120 at vehicle 130 and mobile device 120 begins capturing image frames to match a three-dimensional computer-aided design (CAD) surface model of the vehicle to vehicle 130 in the image frame, such as image display 300. If mobile device 120 successfully locks onto the vehicle 130, the maneuver can begin, or is permitted. In one or more embodiments, a user may be asked to provide an additional vehicle motion command such as by pressing a button.

In one or more embodiments, speed of vehicle 130 is used to determine whether optical tethering is appropriate. For example, vehicle 130 may use sensors 150, which may further include wheel speed sensors, accelerometers, rate sensors, GPS, and steering wheel sensors to estimate speed of vehicle 130. Once mobile device 120 is locked onto vehicle 130, for example via an application or the like, features such as vehicle tracking, depth and motion may be extracted from a video captured by a camera of mobile device 120.

In one or more embodiments, vehicle 130 and/or mobile device 120 include machine learning trained to detect the speed of vehicle 130 from captured video. For example, a program installed on mobile device 120 may be able to estimate vehicle speed, vehicle orientation changes and path trajectory. Vehicle speed, orientation and path may be transmitted wirelessly to vehicle 130 along with a time stamp. Vehicle 130 may then check the vehicle speed, vehicle orientation changes, path trajectory and data time stamps to make sure the phone transmission is not stuck and is receiving updated speed data. If vehicle 130 does not trust the speed data, orientation changes and path trajectory vehicle 130 will stop vehicle motion and send the reason for stopping to mobile device 120.

In one or more embodiments, mobile device 120 monitors user movements while tracking vehicle speed. For example, mobile orientation may be measured using mobile sensors to offset deviations to speed. Thus, vehicle 130 can test the speed data, and compares received speed data with vehicle 130's own internal vehicle speed. If the magnitude of the difference of the vehicle speeds is within a threshold, vehicle motion is allowed. Otherwise, remote control and movement of vehicle 130 may be prevented. Thus, if a mobile device 120 is locked onto the wrong vehicle, or if there is a failure in an image frame capture step of the optical tethering, remote control of vehicle 130 is ended. In an alternate embodiment, vehicle 130 may send a vehicle speed measure by vehicle 130 to mobile device 120 with a time stamp so that mobile device 120 can compare the vehicle speed with the estimated vehicle speed.

In one or more embodiments, an image frame counter and hash provides assurance that no image frame is blocked, stuck or providing incorrect information thereby making remote control of a vehicle potentially problematic. More particularly, on each frame captured by mobile device 120, a counter is incremented and transmitted to vehicle 130, vehicle 130 checks that this frame count is not staying still or decreasing by any amount as compared to the previous frame count. If the frame count is not increasing, vehicle motion may be stopped immediately.

However, if mobile device 120 is in such a state that it is incrementing the counter, but not actually processing new image frames, simply checking a frame counter would not suffice even though no new image frames are being processed, thereby creating a potentially problematic scenario. Accordingly, a hash function prevents vehicle 130 motion when no new image frames are processed because identical image frames would not occur if new image frames are processed and a hash function ensures that there will be at least some difference between each image frame. Hash functions have several properties, in that they generate very different hash values for similar input data, are fully determined by the data being hashed (i.e. deterministic), use all the input data, and uniformly distributes the data across an entire set of possible hash values.

Because of these properties, a hash for each image frame can efficiently be computed across an entire image and sent to vehicle 130 to detect stuck frames, even when a counter is incrementing. Thus, if only one pixel changes, the hash will be completely different. Since a hash of an image is much smaller than the image, it is much easier to transport. The vehicle only needs to store the previous hash to perform this check. Optionally, in an alternative embodiment, vehicle 130 may store a buffer of a predetermined number of the previous hashes, for example 15 hashes, to make sure a recent frame was not re-used.

Figure 4:
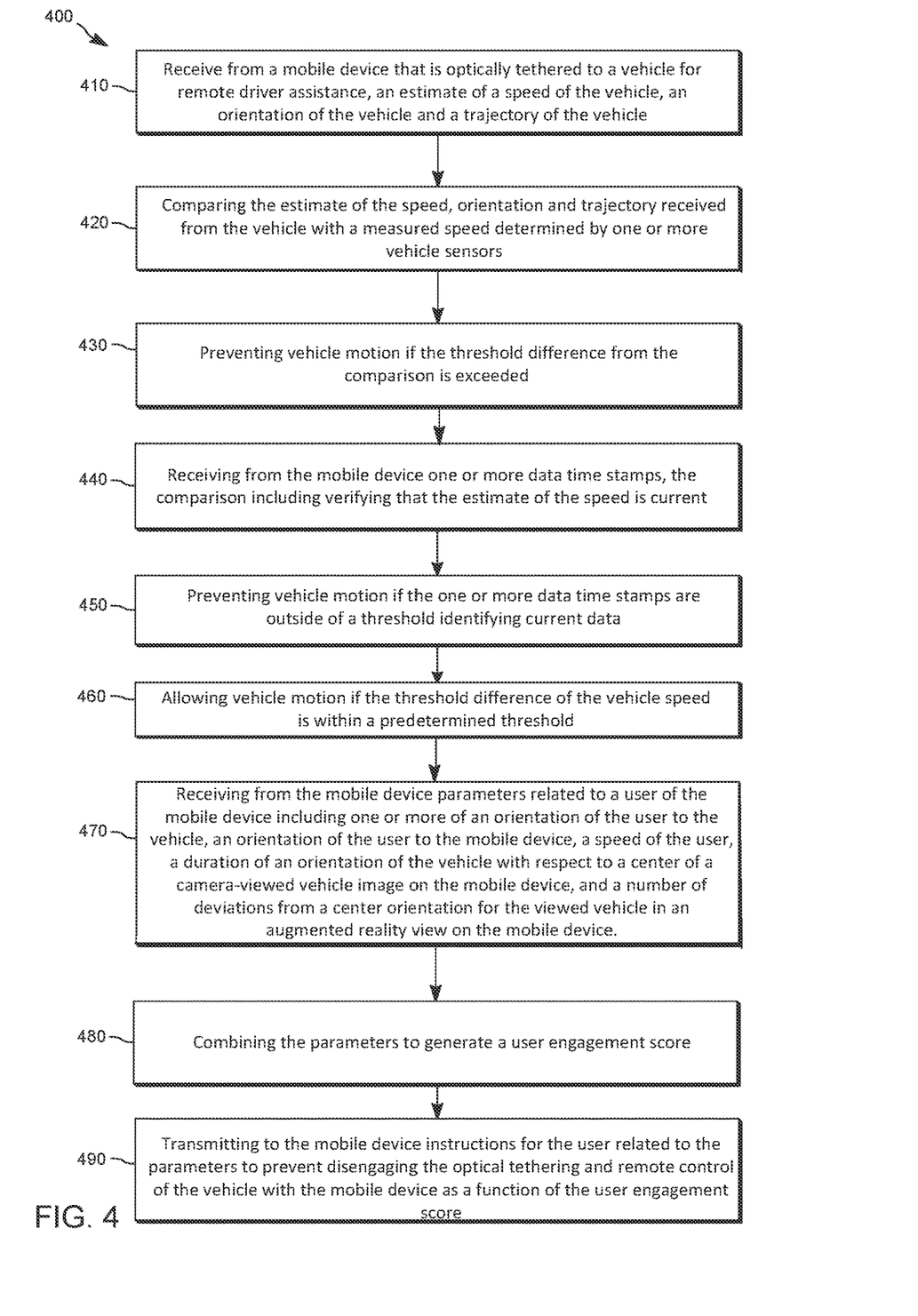
FIG. 4 illustrates an exemplary method in accordance with an embodiment of the disclosure.

Referring to FIG. 4, a flow diagram illustrates a method in accordance with an embodiment of the disclosure. As shown, block 410 provides for receiving from a mobile device that is optically tethered to a vehicle for remote driver assistance, an estimate of a speed of the vehicle, an orientation of the vehicle and a trajectory of the vehicle. For example, mobile device 120 while being optically tethered to vehicle 130 receives an estimate of vehicle 130 speed based on mobile device 120 sensors, camera and the like.

Block 420 provides for comparing the estimate of the speed, orientation and trajectory received from the vehicle with a measured speed determined by one or more vehicle sensors. For example, vehicle 130 measures its own speed using a speedometer and compares the received estimate of speed from mobile device 120.

Block 430 provides for preventing vehicle motion if a threshold difference from the comparison is exceeded. For example, vehicle 130 may stop if the difference between the received speed and the detected actual speed of vehicle 130 are very different or more than a certain mileage per hour or the like. In one or more embodiments, the preventing the vehicle 130 motion can include generating a user engagement score, the user engagement score including a combined score based on at least the speed, orientation and trajectory provided by the mobile device 120. In some embodiments, the method can include transmitting a warning to the mobile device 120 if the user engagement score fails to meet a first predetermined minimum, and disabling the optical tethering and remote control of the vehicle 130 if the user engagement score fails to meet a second predetermined minimum.

Block 440 provides for receiving from the mobile device one or more data time stamps, the comparison including verifying that the estimate of the speed is current. For example, mobile device 120 may transmit data time stamps so that the vehicle 130 identifies a correct speed for comparison.

Block 450 provides for preventing vehicle motion if the one or more data time stamps are outside of a threshold identifying current data. For example, mobile device 120 sends a speed along with a data time stamp, and the data time stamp makes it clear that the mobile device 120 could be lagging or connected to a different vehicle or the like, the vehicle may prevent motion.

Block 460 provides for allowing vehicle motion if the threshold difference of the vehicle speed is within a predetermined threshold. For example, if vehicle 130 determines or confirms that the speed and data time stamps are in sync with the mobile device 120.

In one or more embodiments, the communications between vehicle 130 and mobile device 120 can be via one or more wireless communication nodes or sensors on vehicle 130 over Bluetooth®, Ultra Wide Band (UWB), Bluetooth® Low Energy (BLE), or WiFi using one or more of ultrasonic radar, LiDAR, one or more cameras, one or more emitters or from a cloud-based network.

In one or more embodiments, the method can further include block 470, receiving from the mobile device including one or more of an orientation of the user to the vehicle, an orientation of the user to the mobile device, a speed of the user, a duration of an orientation of the vehicle with respect to a center of a camera-viewed vehicle image on the mobile device, and a number of deviations from a center orientation of the viewed vehicle in an augmented reality view on the mobile device. For example, the vehicle 130 may receive parameters related to user 122 of mobile device 120 including one or more of an orientation of user 122 to vehicle 130, an orientation of the user to the mobile device, a speed of the user, a duration of an orientation of the vehicle with respect to a center of a camera-viewed vehicle image on mobile device 120, and a number of deviations from a center orientation for the viewed vehicle in an augmented reality view on the mobile device including a model of the vehicle. For example, as shown in FIG. 3, deviations 310 show lines where vehicle 130 may move on a display 300 of mobile device 120.

Block 480 provides for combining the parameters to generate a user engagement score. For example, vehicle 130 may generate a user engagement score.

Block 490 provides for transmitting to the mobile device instructions for the user related to the parameters to prevent disengaging the optical tethering and remote control of the vehicle with the mobile device as a function of the user engagement score. For example, after generating a user engagement score, vehicle 130 may determine that disengaging optical tethering is not necessary due to the level of engagement of user 122.

The level of engagement may include a number of deviations with respect to center of a camera-viewed vehicle image, such as deviations 310 shown in FIG. 3. Parameters may include a calculation of deviation based on a plurality of perimeter windows 310 surrounding the image displayed on the mobile device, each window of the plurality of windows representative of a concentric magnitude of deviation, a calculation of a magnitude of deviation from the camera-viewed vehicle image to center, and a calculation of deviations over a predetermined period of time.

In one or more embodiments, the combining the parameters to generate a user engagement score may include combining parameter data received from mobile device 120, the parameter data, including, for example, gaze detection data associated with a front-facing camera on the mobile device, and inertial sensor data indicative of response time of the user associated with the vehicle trajectory and camera focus of the vehicle 130 on a display of mobile device 120.

In one or more embodiments, vehicle 130 may send augmented reality tracking improvement data to mobile device 120 including planned path data if the threshold difference from the comparison is not exceeded.

Figure 5:
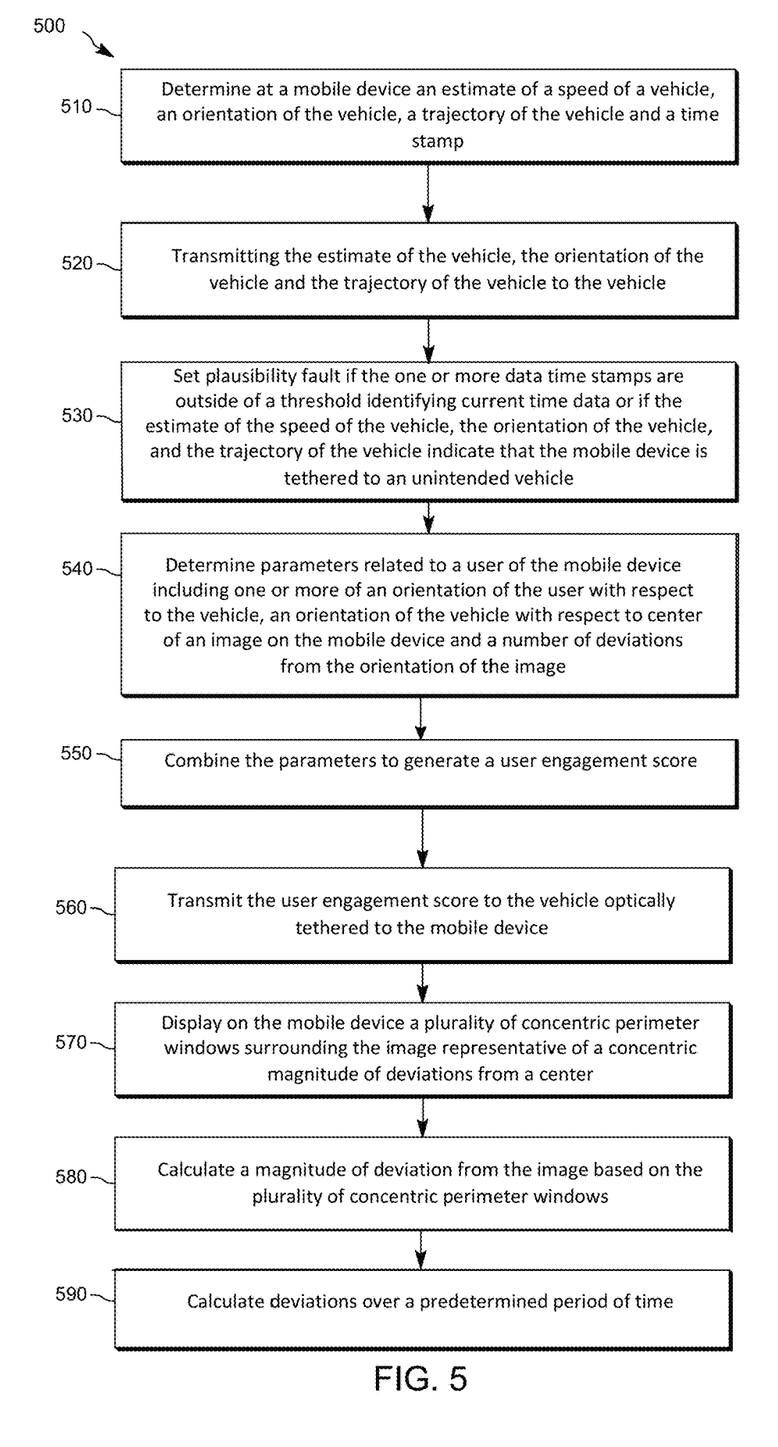
FIG. 5 illustrates a flow diagram of a method in accordance with an embodiment of the disclosure.

Referring now to FIG. 5, a flow diagram illustrates a method for mobile device 120 optically tethered to vehicle 130 in accordance with one or more embodiments. As shown block 510 provides for determining at a mobile device an estimate of a speed of a vehicle, an orientation of the vehicle, a trajectory of the vehicle and a time stamp. For example, mobile device 120 may estimate a speed, orientation and trajectory of vehicle 130 using a camera, GPS or the like.

Block 520 provides for transmitting the estimate of the speed of the vehicle, the orientation of the vehicle and the trajectory of the vehicle to the vehicle. For example, mobile device 120 may transmit to vehicle 130 the speed, orientation and trajectory.

Block 530 provides for setting a plausibility fault for optical tethering to the vehicle if the one or more data time stamps are outside of a threshold identifying current time data or if the estimate of the speed of the vehicle, the orientation of the vehicle, and the trajectory of the vehicle indicate that the mobile device is tethered to an unintended vehicle. For example, if mobile device 120 determines that an unintended vehicle is being tracked using time stamps, speed, orientation or trajectory that could not possibly be vehicle 130, mobile device 120 may disconnect. For example, the untethering can include first warning mobile device 120 using one or more of an audible, visual and haptic feedback.

Block 540 provides for determining parameters related to a user of the mobile device including one or more of an orientation of the user with respect to the vehicle, an orientation of the user with respect to the mobile device, a speed of the user, a duration of an orientation of the vehicle with respect to center of an image on the mobile device, and a number of deviations from the orientation of the image. For example, user 122 using mobile device 120 may determine parameters associated with user 122.

Block 550 provides for combining the parameters to generate a user engagement score. For example, mobile device 120 may combine the parameters to generate a user engagement score.

Block 560 provides for transmitting the user engagement score to the vehicle optically tethered to the mobile device. For example, mobile device 120 may transmit the user engagement score to vehicle 130.

Block 570 provides for displaying on the mobile device a plurality of concentric perimeter windows surrounding the image representative of a concentric magnitude of deviations from a center. For example, mobile device 120 includes a display, such as display 300 shown in FIG. 3 with deviation windows 310 showing a plurality of concentric perimeter windows.

Block 580 provides for calculating a magnitude of deviation from the image based on the plurality of concentric perimeter windows. For example, mobile device 120 may use the deviation windows 310 to calculate a deviation of vehicle 130 from center.

Block 590 provides for calculating deviations over a predetermined period of time. For example, the deviations from center of display 300 can be calculated over a period of time during which engagement by user 122 is expected to be within a threshold to maintain optical tethering or to contribute to a user engagement score.

In one or more embodiments, the combining the parameters to generate a user engagement score can further include combining gaze detection data associated with a front-facing camera on the mobile device, and combining inertial sensor data indicative of response time of the user associated with the vehicle trajectory and camera focus of the vehicle on a display of the mobile device.

In one or more embodiments, the method may further include dynamically changing the size of the plurality of concentric perimeter windows as a function of how close the user is to the vehicle and adjusting a level gain to the user engagement score according to deviations as user focus on the vehicle deviate according the plurality of concentric perimeter windows. For example, if the user 122 is very close to vehicle 130, the image in the center of display 300 may need to be adjusted due to the limits of a camera of mobile device 120.

Referring back to FIG. 1 in combination with FIG. 4, a system in accordance with an embodiment includes vehicle computer 110 with memory 102 that stores computer-executable instructions, transceiver 104 configured to receive from mobile device 120 optically tethered to remotely control vehicle 130, an estimate of a speed, an orientation and a trajectory of vehicle 130, and processor 106 configured to access the memory and execute the method illustrated in flow diagram shown in FIG. 4. For example, the system enables processor 106 to compare the estimate of the speed, orientation and trajectory with a measured speed determined by one or more vehicle sensors, and prevent vehicle motion if a threshold difference from the comparison is exceeded.

In embodiments, processor 106 further receives from mobile device 120 one or more data time stamps, the comparison including a verification that the estimate of the speed is current; and prevents vehicle motion if the one or more data time stamps are outside of a threshold identifying current data and allows vehicle motion if the threshold difference of the vehicle speed is within a predetermined threshold. Processor 106 further generates a user engagement score, the user engagement score including a combined score based on at least the speed, orientation and trajectory provided by mobile device 120, transmits a warning to mobile device 120 if user engagement score fails to meet a first predetermined minimum, and disables optical tethering to remotely control vehicle 130 if the user engagement score fails to meet a second predetermined minimum.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving, from a mobile device that is optically tethered to a vehicle for remote driver assistance, an estimate of a speed of the vehicle, an orientation of the vehicle, and a trajectory of the vehicle and parameters related to a user of the mobile device, the parameters including one or more of: an orientation of the user to the vehicle, an orientation of the user to the mobile device, a speed of the user, a duration of an orientation of the vehicle with respect to a center of a camera-viewed vehicle image on the mobile device, or a number of deviations from a center orientation for the vehicle in an augmented reality view on the mobile device;
determining a user engagement score based on the parameters;
causing to present, via the mobile device, instructions for the user related to the parameters to prevent disengaging optical tethering and remote control of the vehicle with the mobile device as a function of the user engagement score, wherein the number of deviations with respect to center of the camera-viewed vehicle image includes one or more of:
a calculation of deviation based on a plurality of perimeter windows surrounding the camera-viewed vehicle image displayed on the mobile device, each window of the plurality of perimeter windows representative of a concentric magnitude of deviation;
a calculation of a magnitude of deviation from the camera-viewed vehicle image to center; or
a calculation of deviations over a predetermined period of time;
comparing the estimate of the speed, orientation, and trajectory received from the vehicle with a measured speed determined by one or more vehicle sensors; and
preventing vehicle motion based on a threshold difference from the comparison being exceeded.

2. The method of claim 1, further comprising:
receiving, from the mobile device, one or more data time stamps, the comparison including verifying that the estimate of the speed is current;
preventing vehicle motion based on the one or more data time stamps being outside of a threshold identifying current data; and
allowing vehicle motion based on the threshold difference of the speed being within a predetermined threshold.

3. The method of claim 1, wherein the preventing vehicle motion if the threshold difference from the comparison is exceeded further comprises:
generating a user engagement score, the user engagement score including a combined score based on at least the speed, orientation, and trajectory provided by the mobile device; and
transmitting a warning to the mobile device based on the user engagement score failing to meet a first predetermined minimum; and
disabling the optical tethering and remote control of the vehicle based on the user engagement score failing to meet a second predetermined minimum.

4. The method of claim 1, wherein the vehicle and the mobile device communicate via one or more wireless communication nodes on the vehicle using one or more of ultrasonic radar, LiDAR, one or more cameras, one or more emitters or from a cloud-based network.

5. The method of claim 1, further comprising:
transmitting, to the mobile device, instructions for the user related to the parameters to prevent disengaging the optical tethering and remote control of the vehicle with the mobile device as a function of the user engagement score.

6. The method of claim 1, wherein the combining the parameters to generate the user engagement score further comprises:
  combining parameter data received from the mobile device, the parameter data, including:
    gaze detection data associated with a front-facing camera on the mobile device; and
    inertial sensor data indicative of response time of the user associated with the trajectory of the vehicle and camera focus of the vehicle on a display of the mobile device.

7. The method of claim 1, further comprising:
  sending augmented reality tracking improvement data to the mobile device including planned path data based on the threshold difference from the comparison not being exceeded.

8. A system for a vehicle comprising:
  a memory that stores computer-executable instructions;
  a transceiver configured to receive from a mobile device that is optically tethered to remotely control the vehicle, an estimate of a speed of the vehicle, an orientation of the vehicle and a trajectory of the vehicle and parameters related to a user of the mobile device, the parameters including one or more of: an orientation of the user to the vehicle, an orientation of the user to the mobile device, a speed of the user, a duration of an orientation of the vehicle with respect to a center of a camera-viewed vehicle image on the mobile device, or a number of deviations from a center orientation for the vehicle in an augmented reality view on the mobile device; and
  a processor configured to access the memory and execute the computer-executable instructions to:
  determine a user engagement score based on the parameters;
  cause to present, via the mobile device, instructions for the user related to the parameters to prevent disengaging optical tethering and remote control of the vehicle with the mobile device as a function of the user engagement score, wherein the number of deviations with respect to center of the camera-viewed vehicle image includes one or more of:
  a calculation of deviation based on a plurality of perimeter windows surrounding the camera-viewed vehicle image displayed on the mobile device, each window of the plurality of perimeter windows representative of a concentric magnitude of deviation;
  a calculation of a magnitude of deviation from the camera-viewed vehicle image to center; or
  a calculation of deviations over a predetermined period of time;
  compare the estimate of the speed, orientation, and trajectory with a measured speed determined by one or more vehicle sensors; and
  prevent vehicle motion if a threshold difference from the comparison is exceeded.

9. The system of claim 8, wherein the processor configured to access the memory and execute the computer-executable instructions is further configured to:
  receive, from the mobile device, one or more data time stamps, the comparison including a verification that the estimate of the speed is current; and
  prevent vehicle motion if the one or more data time stamps are outside of a threshold identifying current data.

10. The system of claim 9, wherein the processor configured to access the memory and execute the computer-executable instructions is further configured to:
  allow vehicle motion if the threshold difference of the speed is within a predetermined threshold.

11. The system of claim 8, wherein the processor configured to access the memory and execute the computer-executable instructions is further configured to:
  generate a user engagement score, the user engagement score including a combined score based on at least the speed, orientation and trajectory provided by the mobile device;
  transmit a warning to the mobile device if the user engagement score fails to meet a first predetermined minimum; and
  disable the optical tethering to remotely control the vehicle if the user engagement score fails to meet a second predetermined minimum.

12. The system of claim 8, wherein the processor configured to access the memory and execute the computer-executable instructions is disposed in a vehicle computer, the vehicle computer configured to enable automated driving as a self-driving vehicle.

13. A method for a mobile device optically tethered to remotely control a vehicle, the method comprising:
  receiving, from the mobile device, an estimate of a speed of the vehicle, an orientation of the vehicle, a trajectory of the vehicle, and a time stamp;
  comparing the estimate of the speed, orientation, and trajectory received from the vehicle with a measured speed determined by one or more vehicle sensors;
  preventing vehicle motion based on a threshold difference from the comparison being exceeded;
  receiving, from the mobile device, parameters related to a user of the mobile device including one or more of an orientation of the user to the vehicle, an orientation of the user to the mobile device, a speed of the user, a duration of an orientation of the vehicle with respect to a center of a camera-viewed vehicle image on the mobile device, and a number of deviations from a center orientation for the viewed vehicle in an augmented reality view on the mobile device;
  combining the parameters to generate a user engagement score;
  transmitting to, the mobile device, instructions for the user related to the parameters to prevent disengaging the optical tethering and remote control of the vehicle with the mobile device as a function of the user engagement score, wherein the number of deviations with respect to center of the camera-viewed vehicle image includes one or more of:
  a calculation of deviation based on a plurality of perimeter windows surrounding the vehicle image displayed on the mobile device, each window of the plurality of perimeter windows representative of a concentric magnitude of deviation;
  a calculation of a magnitude of deviation from the camera-viewed vehicle image to center; and
  a calculation of deviations over a predetermined period of time.

14. The method of claim 13, further comprising:
  setting a plausibility fault if one or more data time stamps are outside of a threshold identifying current time data or if the estimate of the speed of the vehicle, the orientation of the vehicle, and the trajectory of the vehicle indicate that the mobile device is tethered to an unintended vehicle, wherein the plausibility fault includes:

warning the mobile device communicated using one or more of an audible, visual and haptic feedback.

15. The method of claim 13, further comprising:

displaying on the mobile device a plurality of concentric perimeter windows surrounding the image representative of a concentric magnitude of deviations from a center;

calculating a magnitude of deviation from the image based on the plurality of concentric perimeter windows; and calculating deviations over a predetermined period of time.

16. The method of claim 15, wherein the combining the parameters to generate the user engagement score further comprises:

combining gaze detection data associated with a front-facing camera on the mobile device; and combining inertial sensor data indicative of response time of the user associated with the trajectory of the vehicle and camera focus of the vehicle on a display of the mobile device.

17. The method of claim 15, further comprising:

dynamically changing a size of the plurality of concentric perimeter windows as a function of how close the user is to the vehicle; and adjusting a level gain to the user engagement score according to deviations as user focus on the vehicle deviates according the plurality of concentric perimeter windows.

* * * * *